United States Patent
Eguchi et al.

(10) Patent No.: US 10,019,043 B2
(45) Date of Patent: Jul. 10, 2018

(54) HARD DISK DRIVE WITH A VIBRATION ISOLATION FRAME

(71) Applicant: HGST Netherlands B.V., Amsterdam (NL)

(72) Inventors: Takehiko Eguchi, Tokyo (JP); Kenji Tomida, Kanagawa-ken (JP); Toshihisa Okazaki, Kanagawa-ken (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 93 days.

(21) Appl. No.: 14/967,667

(22) Filed: Dec. 14, 2015

(65) Prior Publication Data

US 2017/0168527 A1    Jun. 15, 2017

(51) Int. Cl.
*G06F 1/18* (2006.01)

(52) U.S. Cl.
CPC .............. *G06F 1/182* (2013.01); *G06F 1/187* (2013.01)

(58) Field of Classification Search
CPC ................................. G06F 1/187; G06F 1/182
See application file for complete search history.

(56) References Cited

U.S. PATENT DOCUMENTS

| | | | | |
|---|---|---|---|---|
| 4,947,093 A | * | 8/1990 | Dunstan | G11B 5/5582 318/560 |
| 6,097,608 A | * | 8/2000 | Berberich | G11B 33/08 248/560 |
| 6,746,005 B1 | * | 6/2004 | Su | F16F 7/1011 248/638 |
| 7,130,187 B1 | * | 10/2006 | Sun | G06F 1/184 361/679.34 |
| 7,215,506 B2 | | 5/2007 | Albrecht et al. | |
| 7,221,565 B2 | | 5/2007 | Ko | |

(Continued)

FOREIGN PATENT DOCUMENTS

| EP | 0 442 641 B1 | 1/1995 |
|---|---|---|
| EP | 2 503 429 A2 | 9/2012 |

OTHER PUBLICATIONS

Anti-Vibration Frame Hold 3.5" Hard Drive in 5.25" Bay; date unknown; 2 total pages.

(Continued)

*Primary Examiner* — Binh Tran
*Assistant Examiner* — Douglas Burtner
(74) *Attorney, Agent, or Firm* — Patterson & Sheridan, LLP; Steven Versteeg (57) ABSTRACT

Embodiments disclosed herein generally relate to a hard disk drive system with improved isolation from operational vibration. More particularly, embodiments disclosed herein provide a hard disk drive system with a vibration isolation frame and flexible connection without deviation from standard form factor. The standard form factor is the form factor of the hard disk drive with the base plate, but without the isolation frame. The hard disk drive with the isolation frame has the same form factor as the hard disk drive without the isolation frame, but with the base plate. Examples of form factors that may be utilized include the form factors for 3.5 inch and 2.5 inch hard disk drives. It is to be understood that 3.5 inch and 2.5 inch form factors are simply examples. Other size form factors are contemplated as well.

20 Claims, 10 Drawing Sheets

(56) References Cited

U.S. PATENT DOCUMENTS

| | | | | |
|---|---|---|---|---|
| 8,213,174 B1* | 7/2012 | Kapahi | | G06F 1/183 |
| | | | | 248/634 |
| 8,220,230 B2* | 7/2012 | Su | | B65B 63/06 |
| | | | | 100/13 |
| 8,971,036 B1* | 3/2015 | Lau | | G06F 1/20 |
| | | | | 361/679.34 |
| 9,265,171 B1* | 2/2016 | Szeremeta | | H05K 7/14 |
| 9,520,158 B1* | 12/2016 | Lyu | | G11B 33/124 |
| 2003/0169565 A1* | 9/2003 | Wang | | G06F 1/184 |
| | | | | 361/679.33 |
| 2004/0052046 A1* | 3/2004 | Regimbal | | G06F 1/184 |
| | | | | 361/679.33 |
| 2005/0047077 A1* | 3/2005 | Koh | | G06F 1/184 |
| | | | | 361/679.36 |
| 2005/0081224 A1* | 4/2005 | Hsu | | G06F 1/181 |
| | | | | 720/657 |
| 2005/0168929 A1 | 8/2005 | Inoue et al. | | |
| 2006/0061954 A1* | 3/2006 | Lam | | G06F 1/184 |
| | | | | 361/679.35 |
| 2006/0132966 A1* | 6/2006 | Serizawa | | G11B 19/2009 |
| | | | | 360/99.15 |
| 2006/0158070 A1* | 7/2006 | Woods | | G06F 1/184 |
| | | | | 312/223.2 |
| 2006/0158775 A1* | 7/2006 | Sega | | G11B 25/043 |
| | | | | 360/97.15 |
| 2007/0014086 A1* | 1/2007 | Kim | | G06F 1/187 |
| | | | | 361/679.36 |
| 2007/0014087 A1* | 1/2007 | Kwak | | G06F 1/187 |
| | | | | 361/679.33 |
| 2009/0207720 A1 | 8/2009 | Lin | | |
| 2009/0294606 A1* | 12/2009 | Chen | | G06F 1/187 |
| | | | | 248/205.1 |
| 2010/0091444 A1* | 4/2010 | Reid | | G06F 1/1616 |
| | | | | 361/679.37 |
| 2011/0096494 A1 | 4/2011 | Cochrane | | |
| 2012/0175489 A1* | 7/2012 | Taylor | | F16F 15/067 |
| | | | | 248/563 |
| 2013/0222947 A1* | 8/2013 | Sugii | | G11B 23/505 |
| | | | | 360/99.08 |
| 2014/0239145 A1* | 8/2014 | Miyakoshi | | F16F 1/3732 |
| | | | | 248/562 |
| 2015/0268702 A1* | 9/2015 | Huang | | G06F 1/187 |
| | | | | 361/679.35 |
| 2016/0198565 A1* | 7/2016 | Smith | | G06F 1/20 |
| | | | | 361/679.34 |
| 2016/0209891 A1* | 7/2016 | Peng | | G06F 1/187 |
| 2016/0216740 A1* | 7/2016 | Lin | | G06F 1/1658 |
| 2017/0010640 A1* | 1/2017 | Yang | | G06F 1/187 |
| 2017/0060195 A1* | 3/2017 | Kim | | G06F 1/182 |

OTHER PUBLICATIONS

Design and Analysis of Shock and Random Vibration Isolation of Operating Hard Disk Drive in Harsh Environment; Shock and Vibration, vol. 16, Issue 2; dated 2009; 1 page.

* cited by examiner

HARD DISK DRIVE WITH A VIBRATION ISOLATION FRAME

BACKGROUND

Field

Embodiments disclosed herein generally relate to a hard disk drive and hard disk drive systems with a vibration isolation frame.

Description of the Related Art

The actual environment in which a hard disk drive works, e.g., a personal computer (PC) or a server, generates operational vibration. For example, cooler fans and other equipment in a box generate vibrations, which transfer to the hard disk drive through physical connections between the box and the hard disk drive. These physical connections include fixtures and an interface connector that directly or indirectly connect the vibration-generating elements to the hard disk drive.

The positioning of a magnetic head provided at the tip of a head actuator is precisely controlled in order to read and write data on a magnetic disk with accuracy. Operational vibrations cause vibration of the head actuator and the disks in the hard disk drive, which results in disturbance to the head positioning control.

Operational vibrations transferred to the hard disk drive result in increased positioning error of the hard disk drive and degradation of input/output (I/O) performance. At the same time, requirements for capacity and I/O performance of hard disk drives are increasing. These demands make the effects of operational vibration more severe.

Previous attempts to address operational vibrations have generally involved changes to the outer dimensions of the hard disk drive. For example, a 3.5-inch form factor hard disk drive might be insulated from vibration by an outer casing that changes the dimensions of the box such that the elements are no longer consistent with 3.5-inch form factor. Such solutions drive up cost and lead to incompatibility with systems.

Therefore, there is a need in the art for improved vibrational isolation of the hard disk drive.

SUMMARY

Embodiments disclosed herein generally relate to a hard disk drive system with improved isolation from operational vibration. More particularly, embodiments disclosed herein provide a hard disk drive system with a vibration isolation frame and flexible connection without deviation from standard form factor. The standard form factor is the form factor of the hard disk drive with the base plate, but without the isolation frame. The hard disk drive with the isolation frame has the same form factor as the hard disk drive without the isolation frame, but with the base plate. Examples of form factors that may be utilized include the form factors for 3.5 inch and 2.5 inch hard disk drives. It is to be understood that 3.5 inch and 2.5 inch form factors are simply examples. Other size form factors are contemplated as well.

One embodiment herein provides a hard disk drive system with a hard disk drive mounted to a base plate. A printed circuit board is also mounted to the base plate. An isolation frame is also mounted to the base plate. The isolation frame includes one or more isolation mounts disposed between the base plate and the isolation frame. The dimension of the outer edge of the isolation frame is approximately equal to the dimension of the outer edge of the base plate.

Another embodiment herein provides a vibration isolation system for a hard disk drive system. The vibration isolation system includes an isolation frame comprising one or more isolation mounts. The one or more isolation mounts are adapted to be disposed between the isolation frame and a base plate of a hard disk drive system. The dimension of the outer edge of the isolation frame is approximately equal to the dimension of the outer edge of the base plate.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a hard disk drive with a vibration isolation frame that may be utilized for any suitable hard disk drive form factor size. A hard disk drive is housed in a box (e.g., a PC box or a server box). Other elements in the box cause measurable operational vibration, which causes vibration of the mechanical parts of the hard disk drive. The result is an increase in position error signal, which compromises performance. The vibration isolation frame serves to isolate the hard disk drive from the vibrations of the surrounding elements of the system, reducing position error signal, while adhering to the dimensions of the standard form factor. The standard form factor is the form factor of the hard disk drive with the base plate, but without the isolation frame. The hard disk drive with the isolation frame has the same form factor as the hard disk drive without the isolation frame, but with the base plate. Examples of form factors that may be utilized include the form factors for 3.5 inch and 2.5 inch hard disk drives. It is to be understood that 3.5 inch and 2.5 inch form factors are simply examples. Other size form factors are contemplated as well. In one embodiment, physical interfaces between the hard disk drive and the box, such as user taps and an interface connector, are provided on an isolation frame. A base plate that contains almost all mechanical parts of the hard disk drive is isolated from the box and other elements by isolation mounts and a flexible connection from the isolation frame and surrounding vibrations.

Figure 1A:
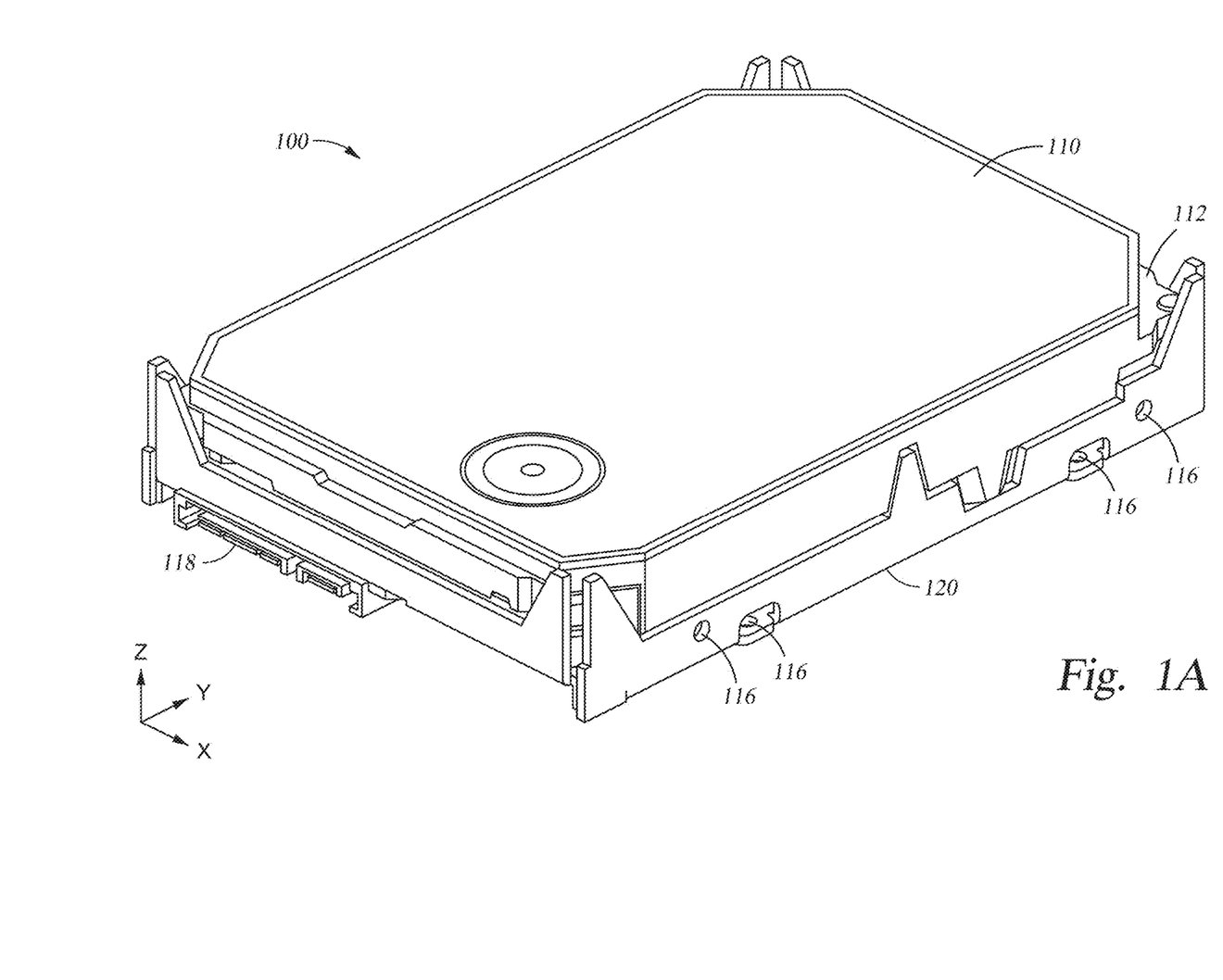
FIG. 1A is a perspective schematic illustration of a hard disk drive system according to one embodiment.

FIG. 1A is a perspective schematic illustration of a hard disk drive system 100 according to one embodiment. The hard disk drive system 100 comprises a hard disk drive 110 mounted to a base plate 112. The base plate 112 is also mounted to a vibration isolation frame 120. One or more user taps 116 connect the vibration isolation frame 120 to the hard disk drive 110. The vibration isolation frame 120 is of minimal thickness. As shown in the figure, the sides of the base plate 112 are etched or carved away in a thickness adequate to provide space for the thin vibration isolation frame 120 to be mounted to the base plate 112 without appreciably increasing the outer dimensions of the hard disk drive system 100. Maintaining the outer dimensions of the hard disk drive system 100 prevents cost increases and manufacturing challenges. As shown in FIG. 1A, the outer dimensions of the isolation frame 120 along the sides/edges are substantially equal to the outer dimensions along the sides/edges of the base plate 112.

Figure 1B:
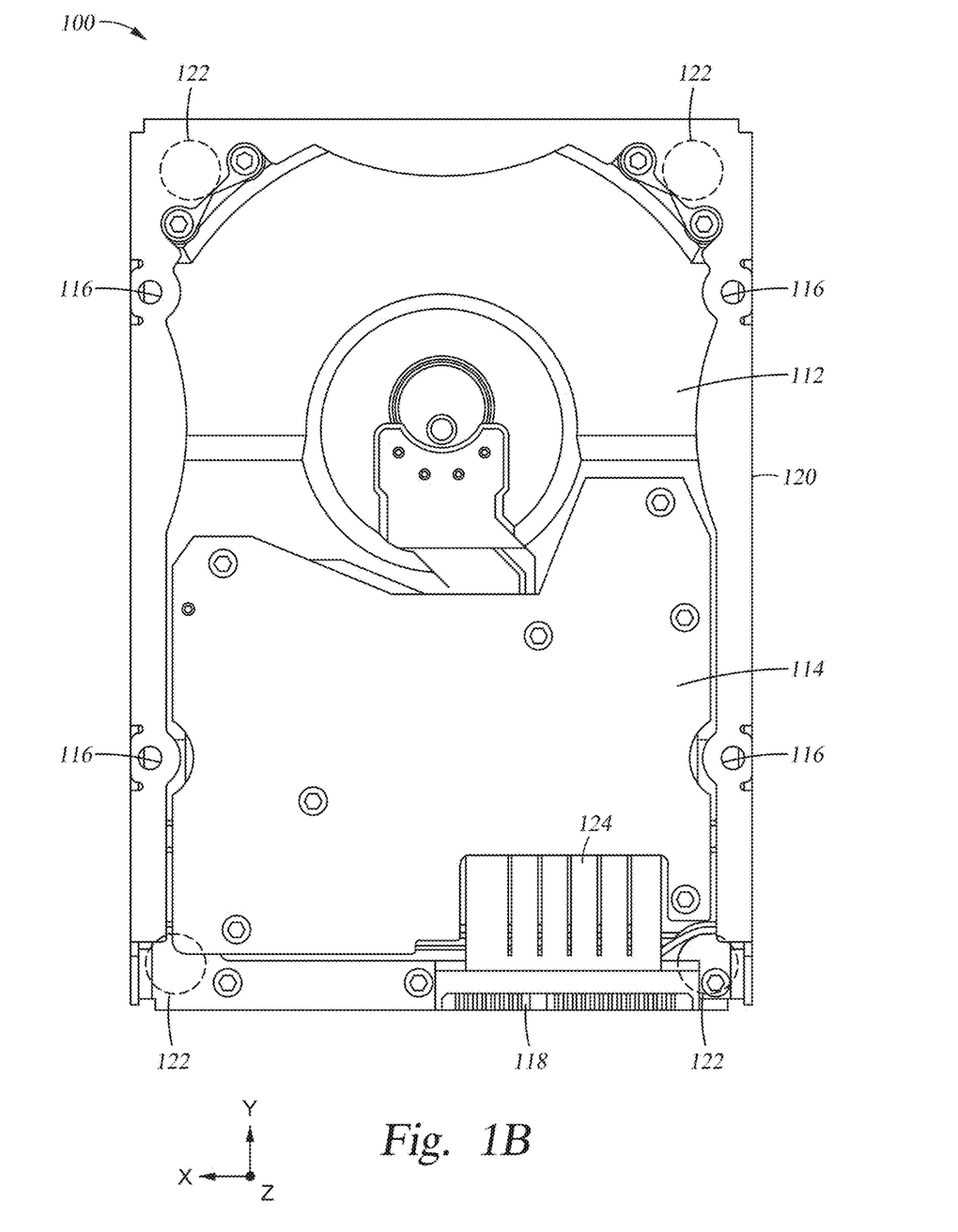
FIG. 1B is a top view illustration of a hard disk drive system according to one embodiment.

FIG. 1B is a top view illustration of hard disk drive system 100. In this view, the hard disk drive 110 (not shown) is hidden from view by the base plate 112. Isolation frame 120 may wrap around the corners of the base plate 112. Base plate 112 is mounted to the isolation frame 120 by user taps 116. The printed circuit board 114 is electrically connected to the interface connector 118 via the flexible connection 124. The interface connector 118 also connects to the isolation frame 120 (see FIG. 1A). Isolation mounts 122 (not shown) are disposed between the base plate 112 and the hard disk drive 110. Isolation mounts 122 may be disposed at the four corners of the base plate 112 between the base plate 112 and the isolation frame 120. Isolation mounts 122 comprise a flexible material that serves to isolate the hard disk drive 110 from operational vibrations emitted by the other elements of the hard disk drive system 100.

Figure 1C:
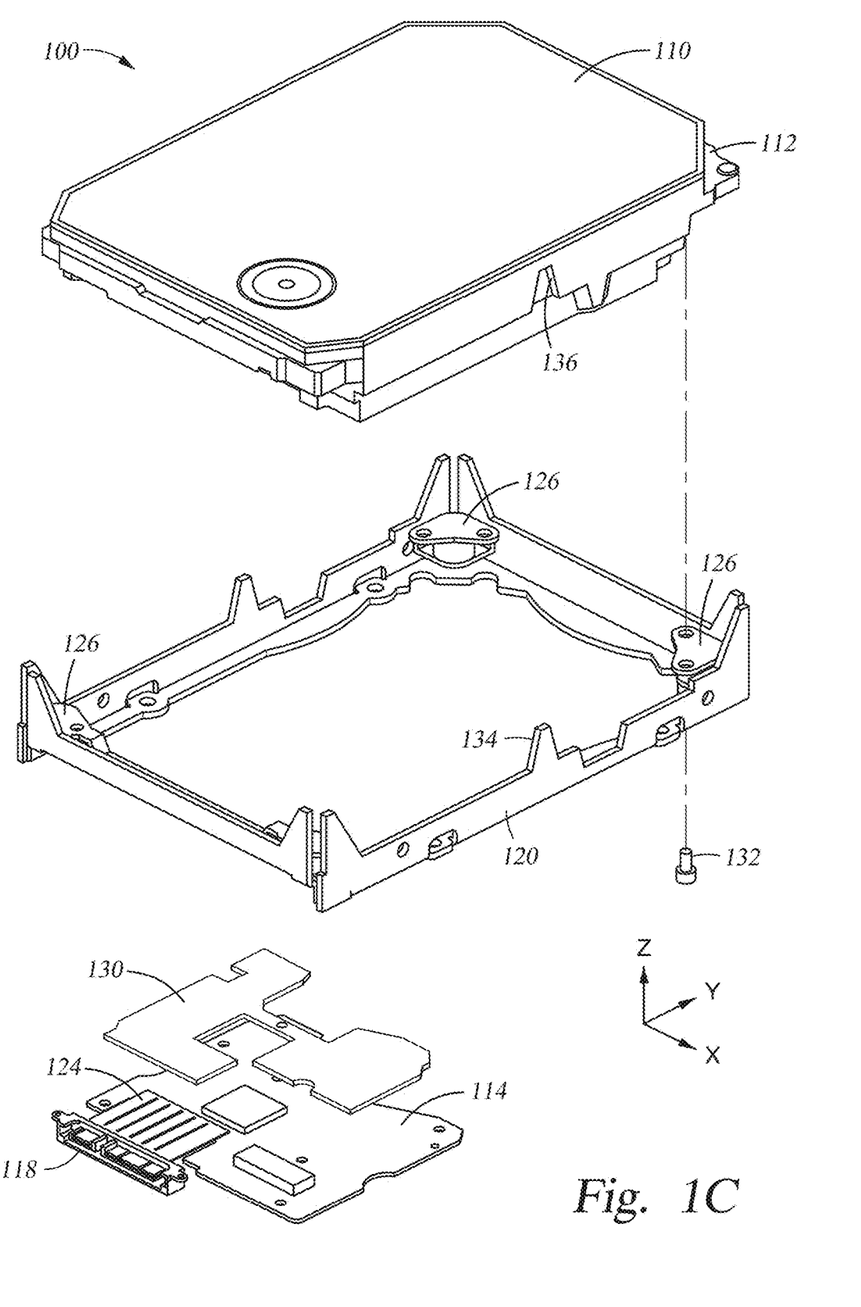
FIG. 1C is an exploded perspective schematic illustration of a hard disk drive system according to one embodiment.

FIG. 1C is an exploded perspective schematic illustration of hard disk drive system 100. As shown, the hard disk drive 110 is mounted to base plate 112. Fastening mechanisms 132, such as screws, connect the base plate 112 to the isolation frame 120 at mount plates 126. As shown, the base plate 112 is cut on the sides to accommodate the edge of the isolation frame 120 so that the overall dimensions of the hard disk drive system 100 are consistent with the standard form factor. The standard form factor is the form factor of the hard disk drive 110 with the base plate 112, but without the isolation frame 120. The hard disk drive 110 with the isolation frame 120 has the same form factor as the hard disk drive 110 without the isolation frame 120, but with the base plate 112. Examples of form factors that may be utilized include the form factors for 3.5 inch and 2.5 inch hard disk drives. It is to be understood that 3.5 inch and 2.5 inch form factors are simply examples. Other size form factors are contemplated as well.

The base plate 112 has a notch 136 formed therein that accommodates a flange 134 of the isolation frame 120. The notch 136 and the flange 134 are vertically and longitudinally aligned such that the flange 134 fits into the notch 136. Because the flange 134 fits into the notch 136, it can be seen that the sides of the base plate 112 and the sides of the isolation frame 120 are vertically aligned so that the isolation frame 120 and the base plate 112 share the same outer dimensions on the sides. The notch 136 and flange 134 allow matching between the sides of the base plate 112 and the sides of the isolation frame 120. Therefore, the hard disk drive system, which includes the hard disk drive 110, base plate 112 and isolation frame 120, has the same form factor as the hard disk drive system without the isolation frame 120.

Fastening mechanisms 132 connect the interface connector 118 to the isolation frame 120 at the mount plates 126. The interface connector connects to the flexible connection 124. The flexible connection 124 connects to the printed circuit board 114. A layer of acoustic foam 130 may also be disposed between the printed circuit board and the hard disk drive. The layer of acoustic foam 130 provides an additional layer of damping and isolation.

Figure 1D:
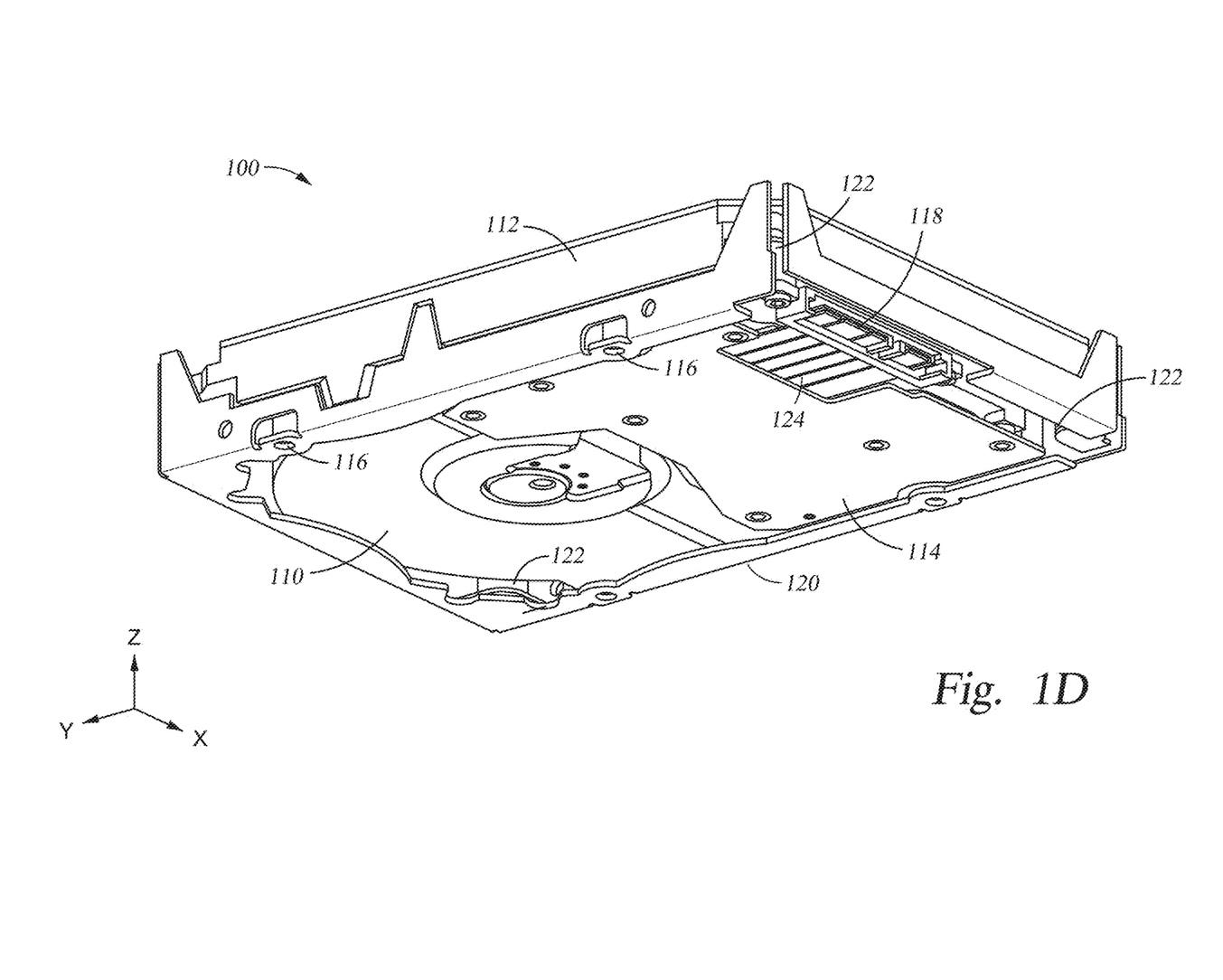
FIG. 1D is a perspective schematic illustration of a hard disk drive system according to one embodiment.

FIG. 1D is a perspective schematic illustration of hard disk drive system 100. Base plate 112 is connected via user taps 116 to the isolation frame 120. Isolation frame 120 connects to the interface connector 118. Interface connector 118 connects to the flexible connection 124. Flexible connection 124 connects to the printed circuit board 114. Flexible connection 124 provides an additional mechanism to isolate hard disk drive 110 from operational vibrations due to the printed circuit board 114. FIG. 1D also illustrates isolation mounts 122. Isolation mounts 122 are disposed between isolation frame 120 and base plate 112.

Figure 2A:
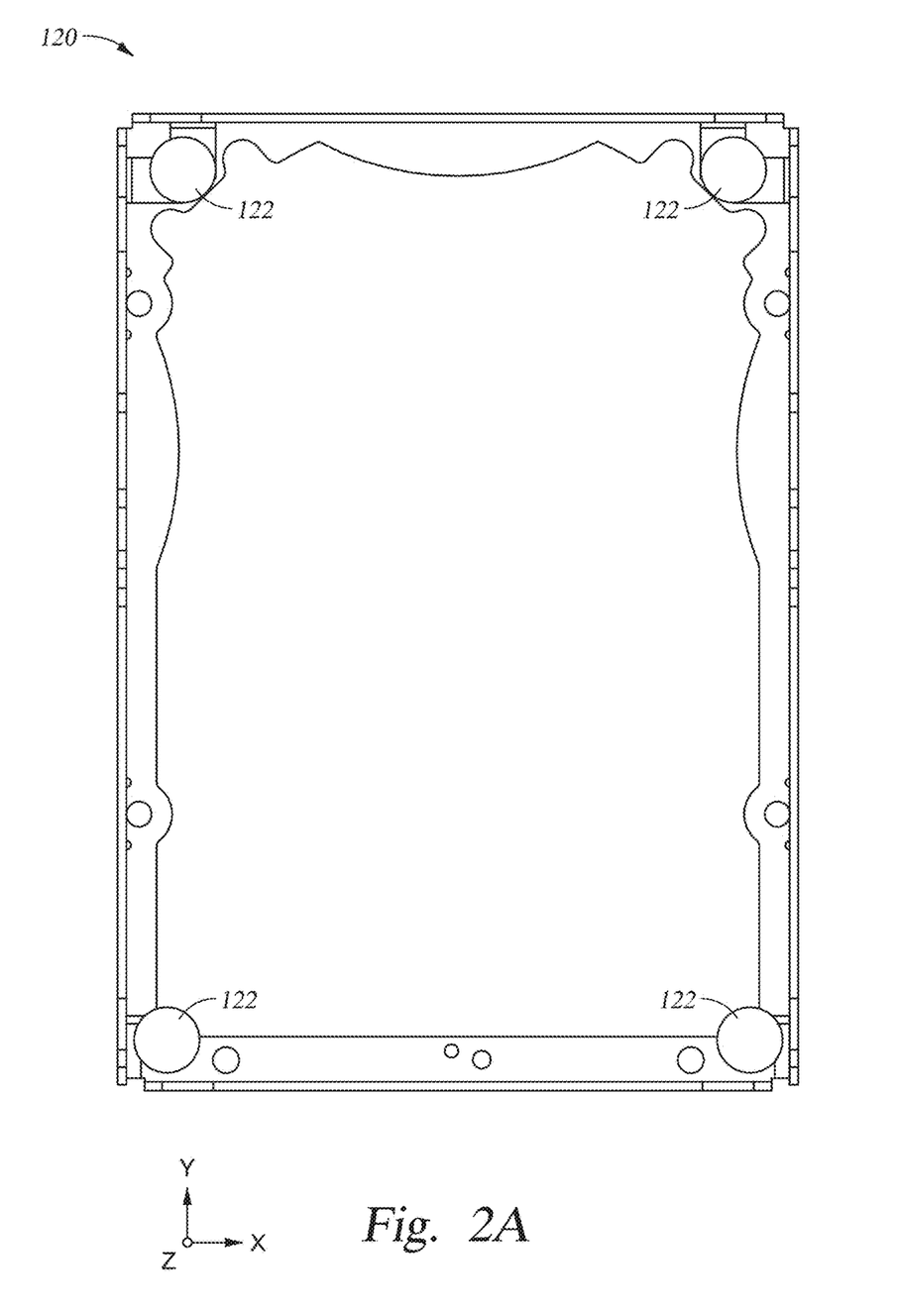
FIG. 2A is a top view of an isolation frame according to one embodiment.
Figure 2B:
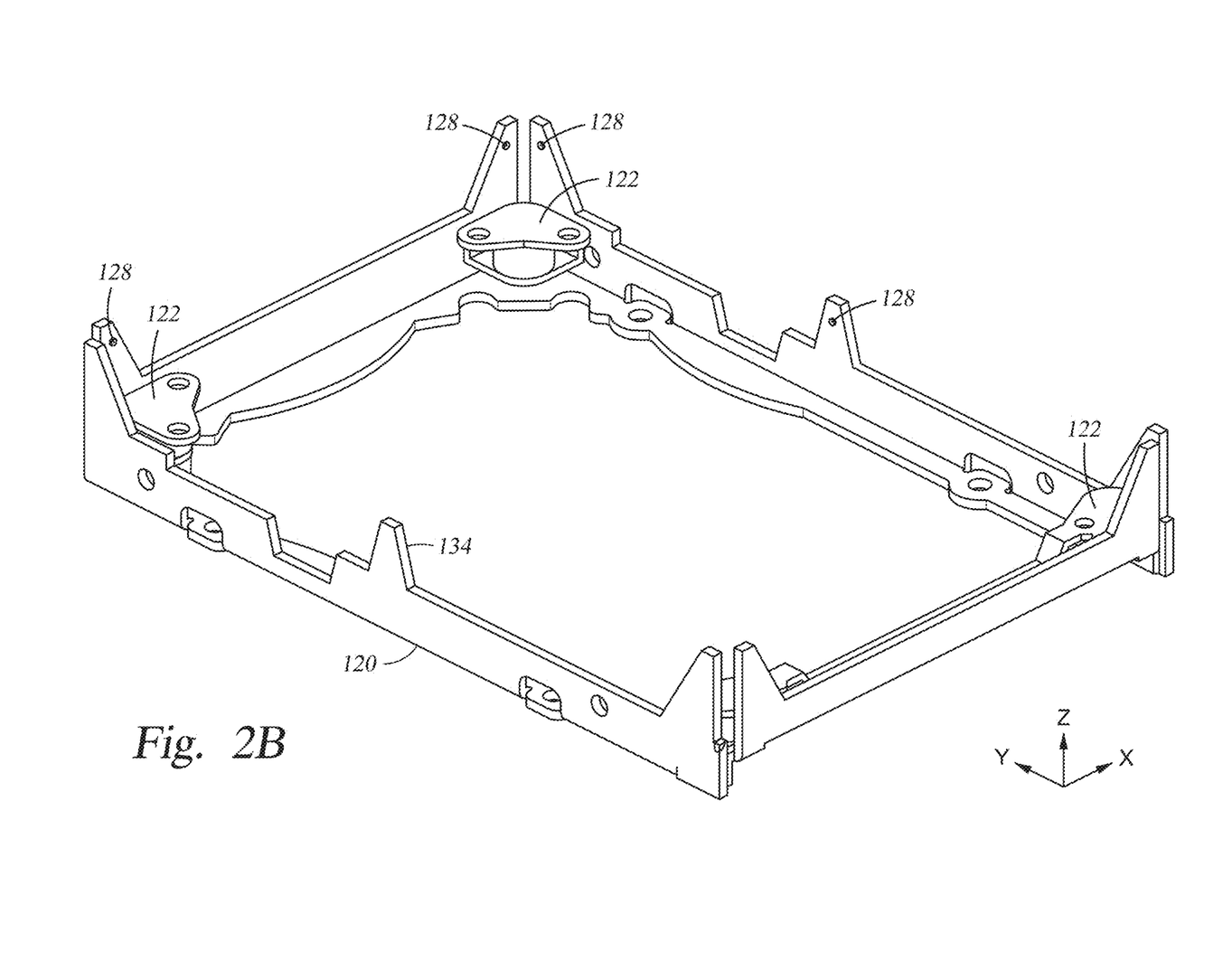
FIG. 2B is a perspective schematic illustration of an isolation frame according to one embodiment.

FIG. 2A provides a top view of isolation frame 120. Isolation frame 120 may comprise steel or aluminum or another kind of metal. A person of ordinary skill in the art will appreciate that a metal with some stiffness will be a material well suited to this function. The outer dimension of isolation frame 120 fits the standard 3.5-inch form factor. Isolation mounts 122 are disposed at or near the four corners of isolation frame 120. A person of ordinary skill in the art will appreciate that the number and locations of isolation mounts 122 may vary. FIG. 2B provides a perspective schematic illustration of isolation frame 120. As in FIG. 2A, isolation mounts 122 are disposed at or near the four corners of the isolation frame 120. FIG. 2B further illustrates rubber bushings 128. Rubber bushings 128 may be disposed on the isolation frame 120 to provide additional protection against hard hits between the isolation frame 120 and the base plate 112 (not shown) when there are significant shocks or impulses on the hard disk drive system 100 (not shown).

Figure 2C:
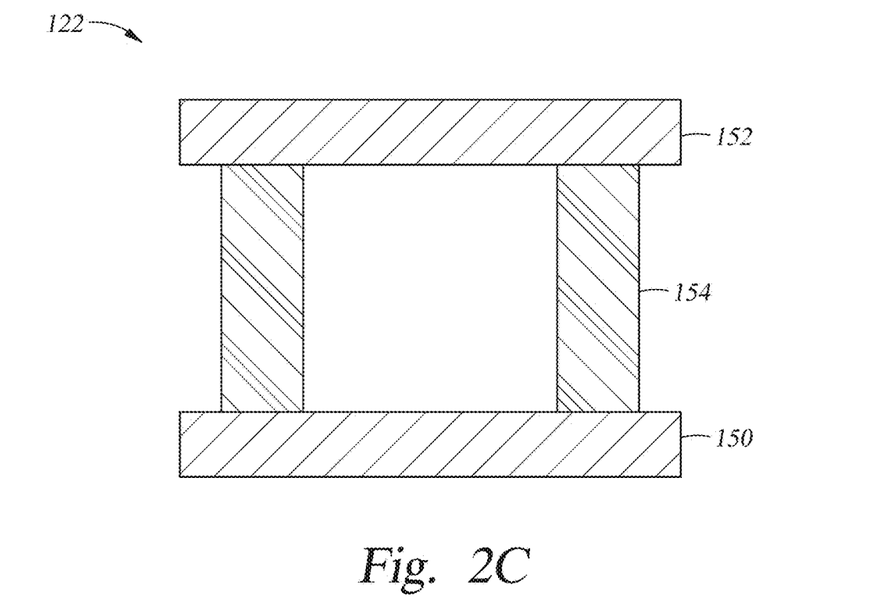
FIG. 2C is a cross-sectional view of an isolation mount according to one embodiment.
Figure 2D:
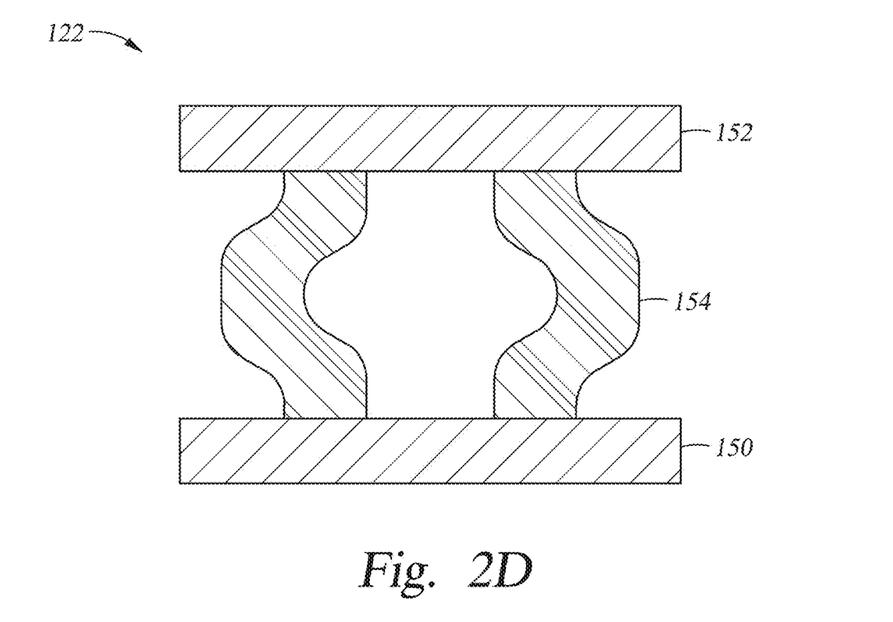
FIG. 2D is a cross-sectional view of an isolation mount according to one embodiment.

As shown in FIGS. 2C and 2D, the isolation mounts 122 are composed of a lower plate 150, an upper plate 152, and a flexible piece 154. The upper plate 152 is fixed to the base plate 112. The lower plate 150 is fixed to the isolation frame 120. The flexible piece 154 may comprise a flexible material such as rubber. For example, the stiffness in the in-plane direction ($K_x$ and $K_y$) may be greater than about $1.0 \times 10^4$ N/m and less than about $1.0 \times 10^6$ N/m. The stiffness in the axial direction ($K_z$) may be greater than about $4.0 \times 10^3$ N/m and less than about $1.0 \times 10^6$ N/m. The total natural frequency of the material comprising the flexible piece 154 may be greater than about 30 Hz and less than about 400 Hz, for example, between about 100 Hz and 200 Hz.

The dimensions of the isolation mounts 122 may vary. For example, the flexible piece 154 may have a diameter of about 10 mm and a height of about 5 mm to 10 mm.

One of the advantages of the isolation frame 120 is to maintain the outer dimension of the hard disk drive system consistent with the standard form factor. The standard form factor is the form factor of the hard disk drive 110 with the base plate 112, but without the isolation frame 120. The hard disk drive 110 with the isolation frame 120 has the same form factor as the hard disk drive 110 without the isolation frame 120, but with the base plate 112. Examples of form factors that may be utilized include the form factors for 3.5 inch and 2.5 inch hard disk drives. It is to be understood that 3.5 inch and 2.5 inch form factors are simply examples. Other size form factors are contemplated as well.

Figure 2E:
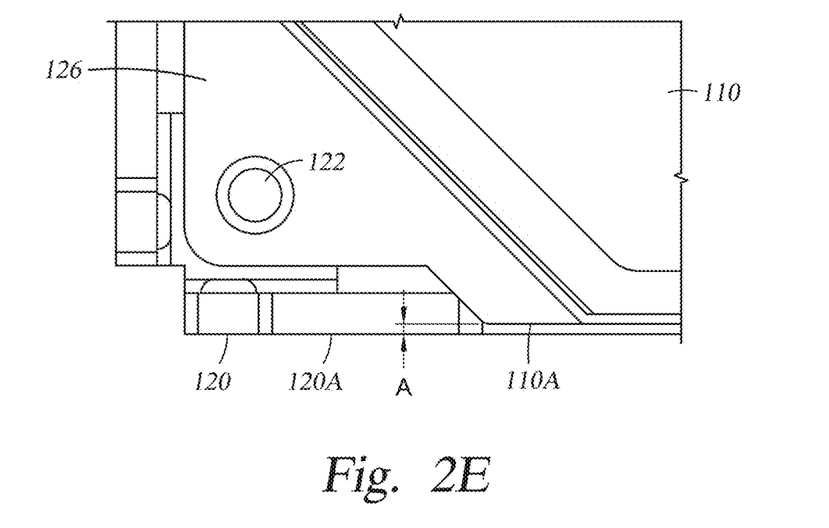
FIG. 2E is a top view of a detail of an isolation frame according to one embodiment.

FIG. 2E is a top view of a detail of a corner of isolation frame 120. Isolation mount 122 is mounted on mount plate 126 of isolation frame 120. Isolation frame 120 is fitted around hard disk drive 110. As shown, side edge 110A of hard disk drive 110 is slightly inside of side edge 120A of isolation frame 120. The distance A is a measure of the difference between the outer dimension of the side edge 110A of the hard disk drive 110 and the outer dimension of the side edge 120A of the isolation frame 120. Distance A is kept small to maintain consistency with the standard form factor. The standard form factor is the form factor of the hard disk drive 110 with the base plate 112, but without the isolation frame 120. The hard disk drive 110 with the isolation frame 120 has the same form factor as the hard disk drive 110 without the isolation frame 120, but with the base plate 112. Examples of form factors that may be utilized include the form factors for 3.5 inch and 2.5 inch hard disk drives. It is to be understood that 3.5 inch and 2.5 inch form factors are simply examples. Other size form factors are contemplated as well. For example, distance A may measure approximately 0.1 mm to approximately 0.3 mm, for example, 0.2 mm. It is to be noted that while there is a distance A between the hard disk drive 110 and the isolation frame 120, there is substantially no distance between the isolation frame 120 and the base plate 112.

Figure 2F:
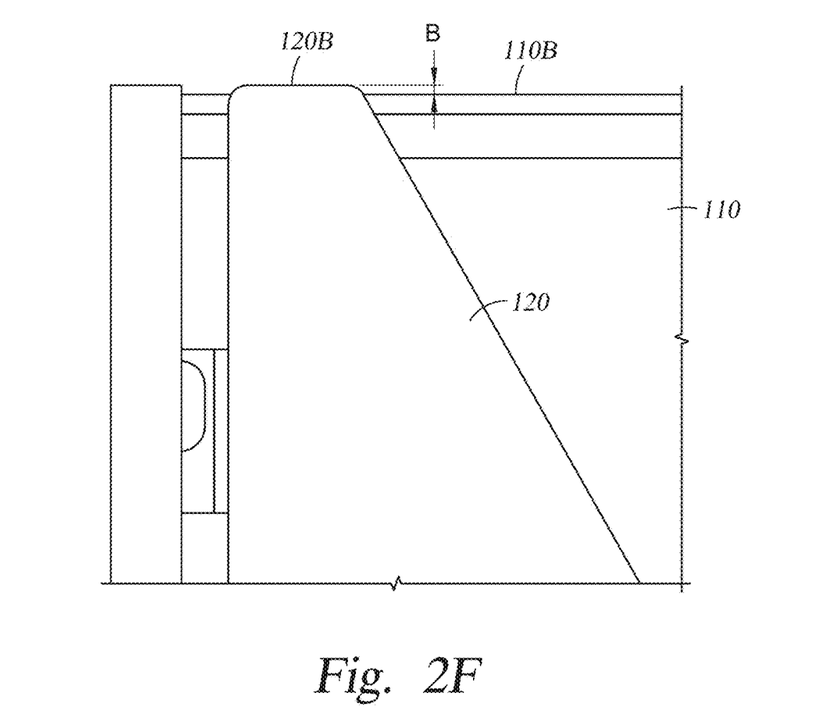
FIG. 2F is a side view of a detail of an isolation frame according to one embodiment.

Similarly, FIG. 2F is a side view of a detail of a corner of isolation frame 120. Top edge 110B of hard disk drive 110 is slightly inside top edge 120B of isolation frame 120. The distance B is a measure of the difference between the outer dimension of the top edge 110B of hard disk drive 110 and the outer dimension of the top edge 120B of the isolation frame 120. Distance B is kept small to maintain consistency with the standard form factor. The standard form factor is the form factor of the hard disk drive 110 with the base plate 112, but without the isolation frame 120. The hard disk drive 110 with the isolation frame 120 has the same form factor as the hard disk drive 110 without the isolation frame 120, but with the base plate 112. Examples of form factors that may be utilized include the form factors for 3.5 inch and 2.5 inch hard disk drives. It is to be understood that 3.5 inch and 2.5 inch form factors are simply examples. Other size form factors are contemplated as well. For example, distance B may measure approximately 0.1 mm to approximately 0.5 mm, for example, 0.25 mm. It is to be noted that while there is a distance B between the hard disk drive 110 and the isolation frame 120, there is substantially no distance between the isolation frame 120 and the base plate 112.

Figure 3A:
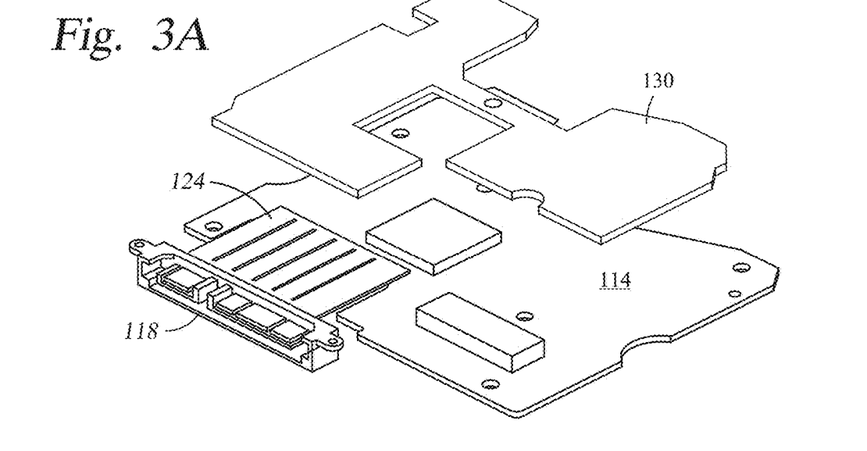
FIG. 3A is a perspective schematic view of a flexible connection according to one embodiment.
Figure 3B:
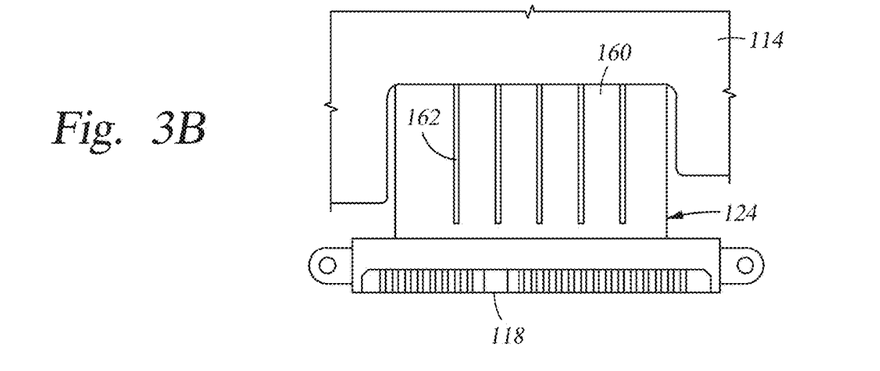
FIG. 3B is a top view of a flexible connection according to one embodiment.
Figure 3C:
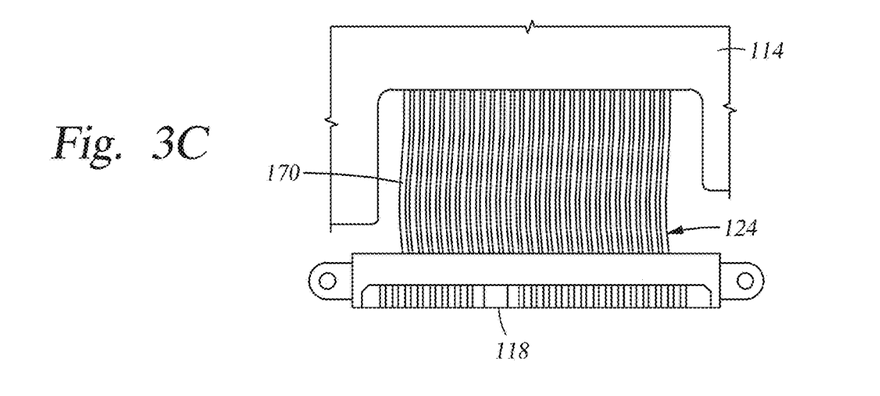
FIG. 3C is a top view of a flexible connection according to one embodiment.

The interface connector and printed circuit board are additional sources of ambient vibration. For effective vibration reduction, an embodiment insulates the hard disk drive 110 from the interface connector and printed circuit board in order to effectively isolate the hard disk drive from ambient vibration. FIG. 3A is a perspective schematic view of a flexible connection according to one embodiment. The printed circuit board 114 connects to a flexible connection 124. The flexible connection 124 connects in turn to the interface connector 118. The interface connector connects in turn to the isolation frame 120 (not shown). The flexible connection 124 between the printed circuit board 114 and the interface connector 118 avoids transference of operational vibration between the interface connector 118 and the printed circuit board 114. In one embodiment, shown in FIG. 3B, the flexible connection 124 comprises a flexible printed circuit 160. The flexible printed circuit 160 connects the printed circuit board 114 to the interface connector 118. The flexible printed circuit 160 may comprise one or more slits 162. Slits 162 serve to separate the flexible printed circuit 160 into narrow bands and to reduce the in-plane stiffness of the flexible printed circuit 160. The result is to provide flexibility in the flexible printed circuit 160 to prevent transference of vibrations. In another embodiment, shown in FIG. 3C, the flexible connection 124 comprises a flexible cable 170. The flexible cable 170 connects the printed circuit board 114 to the interface connector 118. The flexible cable 170 may comprise one or more flexible cables. The flexible cable 170 may comprise a plastic coated cable. The one or more flexible cables 170 serve to provide flexibility in the flexible connection 124 to prevent transference of vibrations.

Figure 4:
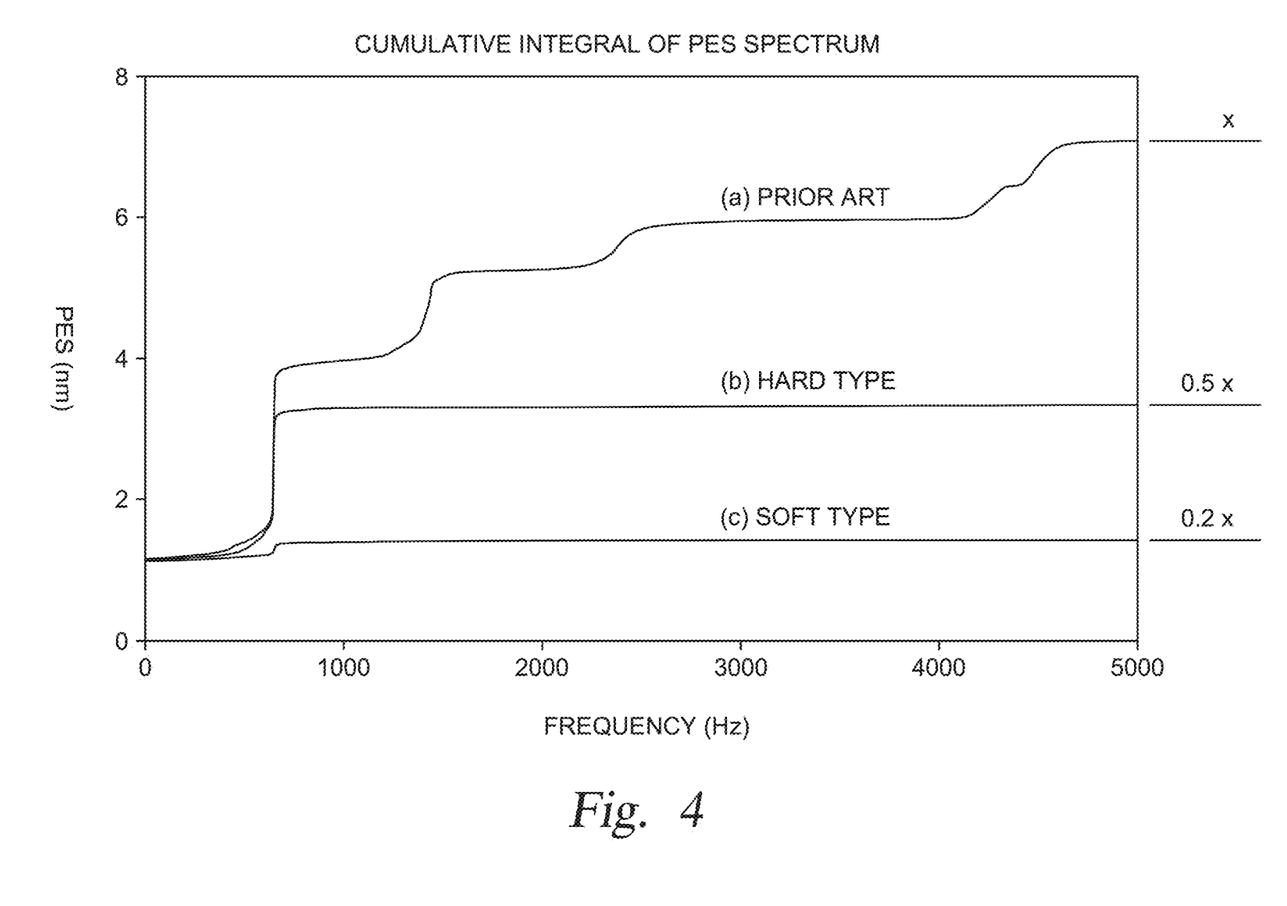
FIG. 4 is a graph comparing the cumulative integral of position error signal for more than one embodiment.

The effect of the isolation frame 120 is to reduce position error signal. FIG. 4 is a graph comparing the cumulative integrals of position error signal (PES) for (a) a comparative example that does not include an isolation frame; (b) an embodiment that includes an isolation frame comprising a material having a hard type resonance frequency; and (c) an embodiment that includes an isolation frame comprising a material having a soft type resonance frequency. Comparative example (a), which lacks an isolation frame, demonstrates the highest cumulative integral of position error signal, indicating the highest level of vibration and the greatest performance degradation. Embodiment (b) includes an isolation frame with a hard type resonance frequency. Hard type resonance frequency is about 220 Hz. Embodiment (b) demonstrates a cumulative integral of position error signal of 0.5× from the comparative example (which includes no isolation) of x, or a 50% reduction in positioning error. Embodiment (c) includes an isolation frame with a soft type resonance frequency. Soft type resonance frequency is about 60 Hz. Embodiment (c) demonstrates a cumulative integral of position error signal of 0.2× from the comparative example (which includes no isolation) of x, or an 80% reduction in positioning error. The graph shows, therefore, that isolation at either hard-type or soft-type resonance frequency causes a dramatic reduction in position error signal, resulting in decreased vibration and improved performance.

In sum, an isolation frame with isolation mounts provides significant reduction in transference of vibration to the hard disk drive, resulting in reduction of position error signal and improved performance. Use of a flexible connection to connect the printed circuit board to the interface connector and then to the isolation frame similarly prevents transference of operation vibration, again resulting in reduction of position error signal. By carving the edge of the base plate to allow matching between the edges of the base plate and the edges of the isolation frame, the isolation mechanism can be added without deviating from the standard form factor. The standard form factor is the form factor of the hard disk drive with the base plate, but without the isolation frame. The hard disk drive with the isolation frame has the same form factor as the hard disk drive without the isolation frame, but with the base plate. Examples of form factors that may be utilized include the form factors for 3.5 inch and 2.5 inch hard disk drives. It is to be understood that 3.5 inch and 2.5 inch form factors are simply examples. Other size form factors are contemplated as well. The carved-out edge of the base plate forms a notch that receives a flange from the isolation frame. The edges of the base plate and isolation frame are thus aligned vertically and, more importantly, the hard disk drive system, which includes the hard disk drive, base plate and isolation frame, has the same form factor as the hard disk drive system without the isolation frame. Use of a layer of acoustic foam further damps vibrations. These embodiments lead to reduction in position error signal, which leads to improved performance, without a significant increase in cost.

While the foregoing is directed to embodiments of the disclosure, other and further embodiments may be devised without departing from the basic scope thereof, and the scope thereof is determined by the claims that follow.

What is claimed is:

1. A hard disk drive system, comprising:
a hard disk drive mounted to a base plate;
a printed circuit board mounted to the base plate; and
an isolation frame mounted to the base plate, wherein:
the isolation frame comprises one or more isolation mounts comprising a lower plate fixed to the isolation frame, an upper plate fixed to the base plate and a flexible portion having at least one concave section and one convex section that are mirrored wherein the flexible portion is positioned between the lower plate and the upper plate, wherein the one or more isolation mounts are disposed between the base plate and the isolation frame; and
the dimension of the outer edge of the isolation frame is approximately equal to the dimension of the outer edge of the base plate.

2. The hard disk drive system of claim 1, wherein the isolation frame further comprises one or more rubber bushings disposed between the base plate and the isolation frame.

3. The hard disk drive system of claim 1, wherein the isolation frame comprises steel.

4. The hard disk drive system of claim 1, wherein the one or more isolation mounts comprise rubber.

5. The hard disk drive system of claim 4, wherein a natural frequency of the rubber comprising the one or more isolation mounts is less than about 400 Hz and greater than about 30 Hz.

6. The hard disk drive system of claim 1, further comprising:
an interface connector, wherein the interface connector is electrically connected to the printed circuit board via a flexible cable.

7. The hard disk drive system of claim 6, wherein the flexible cable comprises a flexible printed circuit.

8. The hard disk drive system of claim 7, wherein the flexible printed circuit comprises one or more slits.

9. The hard disk drive system of claim 8, wherein if the flexible printed circuit comprises more than one slit, the slits are parallel to one another.

10. The hard disk drive system of claim 6, wherein the flexible cable comprises one or more cables coated in plastic.

11. The hard disk drive system of claim 1, further comprising a layer of acoustic foam disposed between the base plate and the printed circuit board.

12. The hard disk drive system of claim 1, wherein the outer edge of the base plate has a notch formed therein.

13. The hard disk drive of claim 12, wherein the outer edge of the isolation frame has a flange, and wherein the flange is disposed within the notch.

14. A vibration isolation system for a hard disk drive system, comprising:
an isolation frame comprising one or more isolation mounts, wherein:
the one or more isolation mounts comprising a lower plate fixed to the isolation frame, an upper plate fixed to a base plate and a flexible portion between the lower plate and the upper plate having at least one concave section and one convex section that are mirrored, wherein the one or more isolation mounts are adapted to be disposed between the isolation frame and the base plate of a hard disk drive system; and
the dimension of the outer edge of the isolation frame is approximately equal to the dimension of the outer edge of the base plate.

15. The vibration isolation system of claim 14, wherein the isolation frame further comprises one or more rubber bushings disposed between the base plate and the isolation frame.

16. The vibration isolation system of claim 14, wherein the isolation frame comprises steel.

17. The vibration isolation system of claim 14, wherein the one or more isolation mounts comprise rubber.

18. The vibration isolation system of claim 17, wherein a natural frequency of the rubber comprising the one or more isolation mounts is less than about 400 Hz and greater than about 30 Hz.

19. The vibration isolation system of claim 14, further comprising a layer of acoustic foam disposed on the base plate.

20. The vibration isolation system of claim 14, wherein the outer edge of the base plate has a notch formed therein, wherein the outer edge of the isolation frame has a flange, and wherein the flange is disposed within the notch.

* * * * *